(12) United States Patent
Janssen

(10) Patent No.: US 6,886,941 B2
(45) Date of Patent: May 3, 2005

(54) COMPACT LIGHT ENGINE WITH LIGHT GUIDES FOR PROJECTION DISPLAY SYSTEM

(75) Inventor: Peter J. Janssen, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 188 days.

(21) Appl. No.: 10/161,753

(22) Filed: Jun. 4, 2002

(65) Prior Publication Data
US 2003/0231262 A1 Dec. 18, 2003

(51) Int. Cl.[7] .................. G03B 21/26; G03B 21/14; G03B 21/00
(52) U.S. Cl. .................. 353/30; 353/122; 353/20
(58) Field of Search .................. 348/744, 751, 348/756, 757, 771; 353/7, 8, 20, 30–34, 81, 82, 84, 122; 349/5, 7, 8, 9, 15

(56) References Cited

U.S. PATENT DOCUMENTS

| | | | |
|---|---|---|---|
| 2,642,487 A | * 6/1953 | Schroeder | 348/339 |
| 4,864,390 A | 9/1989 | Bradley | 358/60 |
| 5,410,370 A | 4/1995 | Janssen | 348/756 |
| 5,416,514 A | 5/1995 | Janssen | 348/196 |
| 5,625,738 A | * 4/1997 | Magarill | 385/146 |
| 5,852,693 A | * 12/1998 | Jeong | 385/47 |
| 5,892,623 A | * 4/1999 | Bradley | 359/618 |
| 5,917,561 A | 6/1999 | Hatanaka | 349/8 |
| 6,309,072 B1 | * 10/2001 | Deter | 353/31 |
| 6,511,183 B2 | * 1/2003 | Shimizu et al. | 353/20 |
| 6,511,184 B2 | * 1/2003 | Yamagishi et al. | 353/31 |
| 6,553,168 B2 | * 4/2003 | Saccomanno | 385/116 |
| 6,563,551 B1 | * 5/2003 | Janssen et al. | 348/759 |
| 6,578,968 B1 | * 6/2003 | Bierhuizen et al. | 353/30 |
| 6,587,269 B2 | * 7/2003 | Li | 359/497 |

* cited by examiner

Primary Examiner—Judy Nguyen
Assistant Examiner—Andrew Sever

(57) ABSTRACT

A light engine for a single panel scrolling color projection display system employs a light guide to guide light from a source through unequal path lengths to an output lens. The light guide is characterized by little or no light loss or increase in etendue (angular extent) regardless of path length, resulting in a compact arrangement having high performance and low cost.

14 Claims, 5 Drawing Sheets

COMPACT LIGHT ENGINE WITH LIGHT GUIDES FOR PROJECTION DISPLAY SYSTEM

CROSS REFERENCE TO RELATED APPLICATION

U.S. patent application Ser. No. 10/161,798, filed Jun. 4, 2002, and assigned to the same Assignee as the present application, relates to loss-less etendue-preserving light guides, which are used in the light engines of the present application.

FIELD OF TECHNOLOGY

This invention relates to light engines for projection display systems, and more particularly relates to a compact light engine employing light guides which is particularly suitable for use in a single panel scrolling color projection display system.

BACKGROUND AND SUMMARY

A single panel scrolling color projection display system is characterized by a single light modulator panel such as a liquid crystal display (LCD) panel having a raster of individual picture elements or pixels, which panel is illuminated by horizontally elongated red, green and blue illumination bars or stripes. The stripes are continuously scrolled vertically across the panel while the illuminated rows of pixels are synchronously addressed with display information corresponding to the color of the then incident stripe. See, for example, U.S. Pat. No. 5,410,370, "Single panel color projection video display improved scanning" issued to P. Janssen on Mar. 25, 1994, and U.S. Pat. No. 5,416,514, "Single panel color projection video display having control circuitry for synchronizing the color illumination system with reading/writing of the light valve" issued to P. Janssen et al. on May 16, 1995.

Such single panel systems are to be distinguished from the more conventional three-panel systems, in which separate red, green and blue beams each fully illuminate and are modulated by a separate light modulator panel. The modulated beams are then superimposed on a display screen to produce a full color display. See, for example, U.S. Pat. No. 5,917,561, "Liquid-crystal image projecting apparatus having a color purity correction filter" issued to Hatanaka on Jun. 29, 1999.

Light engines for both single-panel and three-panel color projection display systems commonly utilize high intensity arc lamps to provide the level of intensity needed for a bright display, as well as dichroic filters to split the lamp light into red, green and blue components for modulation, and then to recombine the modulated components for projection display.

In both the single panel and the three panel systems of the prior art, the desire for high light efficiency has dictated that the optical path lengths of the red, green and blue beams are approximately equal. Otherwise, those beams which must travel farther from the light source to the display panel have a greater etendue (angular extent), and some of light from those beams is lost. See, for example, U.S. Pat. No. B1 4,864,390, "Display System with Equal Path Lengths", issued to McKechnie et al. on Sep. 5, 1989.

Unfortunately, such systems, while efficient in terms of light utilization, require multiple relays of relatively high optical quality to create equivalent images for the three colors. In addition, thorough integration (mixing) of light in the preceding light collection stages is necessary. The large number of optical components contributes significantly to the size and overall cost of the system.

The illumination architecture for a presently used light engine 1 for a scrolling color projector is shown schematically in FIG. 1. White light from source S is split into a blue component B and a green/red component G/R by dichroic element 2. The B component is directed by lens 3 and mirror 4 to prism scanner 5. The G/R component is passed by dichroic element 2 through lens 6 to dichroic element 7, which splits the G/R component into a green component G and a red component R. The G component is reflected by element 7 to prism scanner 8, while the red component is passed through dichroic element 7 to prism scanner 9. The scanned R, G, B components are then directed to recombination dichroic elements 10 and 11 by mirror 12 and relay lenses 13 through 17.

Relay lenses 13 through 17 are designed to limit the light expansion over the long recombination path from the prism scanners 5, 8 and 9 to the output lens 18. Consequently, light that is telecentric at the prism scanners 5, 8 and 9 is not telecentric at the recombination dichroic elements 10 and 11. As a result, color shading is introduced over the scan (from the top to the bottom of the display) unless (expensive) shaded dichroics are used.

In accordance with the invention, at least the light engine portion of a projection display system employs loss-less etendue-preserving light guides, enabling a compact arrangement through the use of unequal path lengths for the separate light beams, while eliminating the need for many high quality optical lenses, and preserving the light efficiency of the equal path length designs of the prior art.

In accordance with one aspect of the invention, a light engine for a projection display system comprises: a beam splitter for splitting light from a source into two or more light components; and a light guide comprising:

at least a source branch for guiding light from the source to the beam splitter; and at least two component branches for guiding the light components away from the beam splitter.

In accordance with a preferred embodiment of the light engine, the beam splitter comprises crossed dichroic elements or splitting the source light into red, green and blue components.

In accordance with another preferred embodiment of the light engine, a scanning stripe generator is provided for the red, green and blue light components, and each component branch of the light guide guides one of the light components to one of the scanning stripe generators.

In accordance with another preferred embodiment of the light engine, a beam recombiner of crossed dichroic elements is provided for recombining the red, green and blue components.

In accordance with another aspect of the invention, a projection display system is provided, the system comprising a light engine of the invention, at least one light modulator panel for modulating light in accordance with a display signal; and a projection lens for projecting the modulated light onto a display screen.

In accordance with a preferred embodiment of the projection display system, a polarizing beam splitter (PBS) is provided between the light engine and the light modulating panel for transmitting light of a first polarization state and reflecting light of a second polarization state transverse to the first polarization state.

BRIEF DESCRIPTION OF THE DRAWING FIGURES

DETAILED DESCRIPTION

Figure 1:
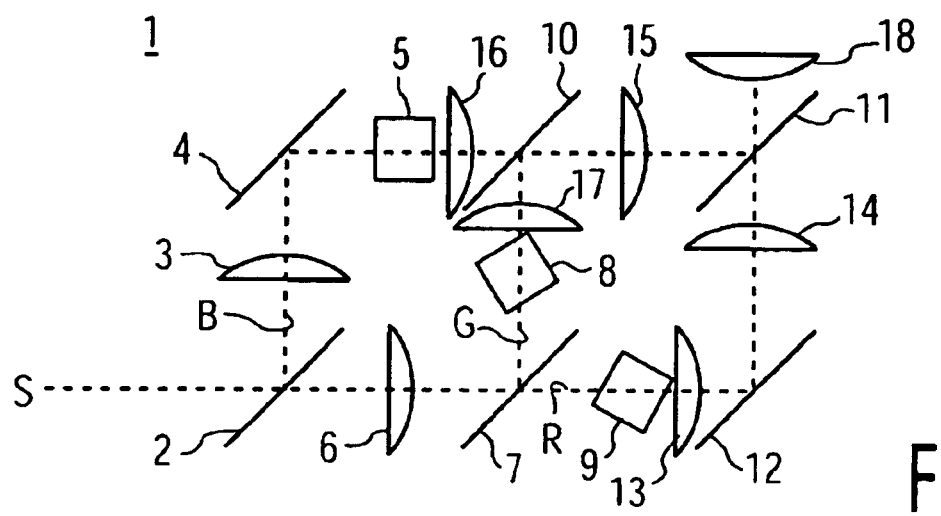
FIG. 1 is a schematic layout for a prior art scrolling color projector having equal path lengths from the light source to the display panel for the red, green and blue beams.
Figure 2A:
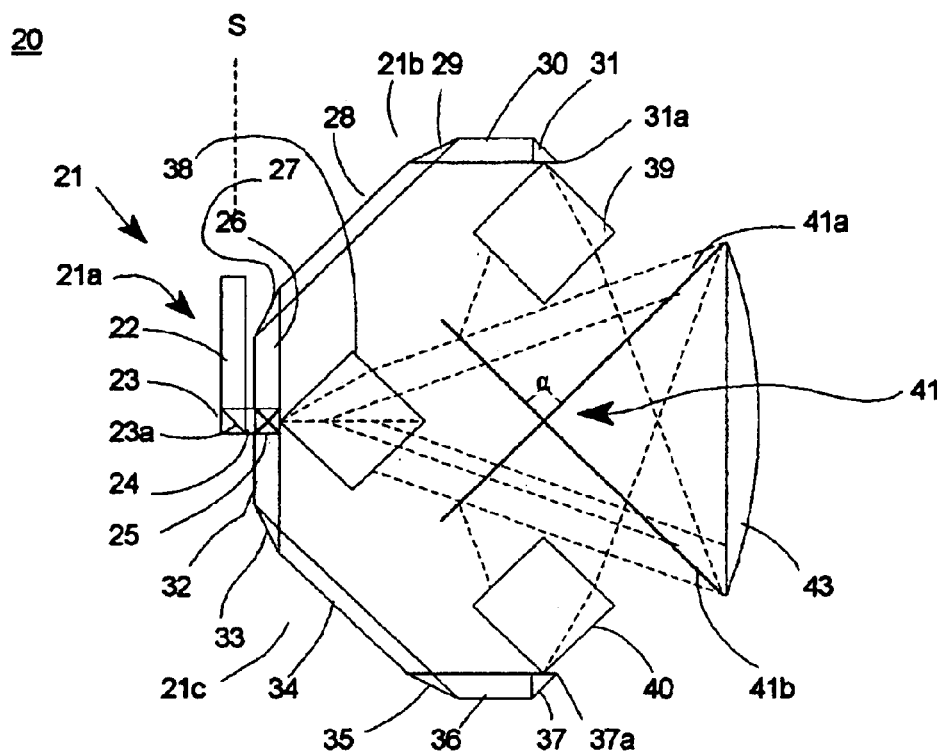
FIGS. 2A through 2C are top, side, front views, respectively, of a compact light engine for a scrolling color projector employing light guides in accordance with one embodiment of the invention.

Referring now to FIG. 2A, a top view of one embodiment 20 of the illumination architecture for a light engine of the invention, white light from a source S, made telecentric by collection optics (not shown), is carried by a source branch 21a of a light guide 21 to a beam splitter 25 that is incorporated in the light guide path. Source branch 21a includes straight light guide sections 22 and 24 of rectangular cross section, and light coupling element 23, having an internal reflecting surface 23a. The beam splitter 25 splits the white light into red, green and blue (R, G, B) components, each of which is directed to a rotating prism (38, 39, 40). The G and R components are piped to prisms 39 and 40 by component branches 21b and 21c, respectively, of light guide 21. Component branches 21b and 21c each include three straight light guide sections of rectangular cross section (26, 28, 30 and 32, 34, 36, respectively) and three light coupling elements (27, 29, 31 and 33, 35, 37, respectively).

Light is guided through the various branches with little or no loss or increase in etandue (angular extent). A more detailed description of the structure and operation of the light guide may be found in copending U.S. patent application Ser. No. 10/161,798, filed concurrently with this application and incorporated herein by reference.

Due to multiple reflections within the different branches of the light guide, the light at the exit apertures 25a, 31a and 37a is thoroughly mixed, hence very uniform. The exit apertures 25a, 31a and 37a are imaged onto the rotating prisms 38, 39 and 40, respectively, forming rectangular color stripes thereon. Parallax of the rotating prisms causes a continuous scrolling motion of the color stripes. The scrolling color stripes are combined by the beam recombiner 41, which includes dichroic elements 41a and 41b, crossed at angle α. A combined image of the R, G and B scrolling stripes is thus delivered to output lens 43.

The telecentricity of the white light at the input is preserved throughout by the light guide branches as well as the recombination dichroics, despite the lack of expensive relay optics. Moreover, this non-imaging architecture is very compact, enabling a light engine for a color projection display which has high performance and low cost.

Figure 2B:
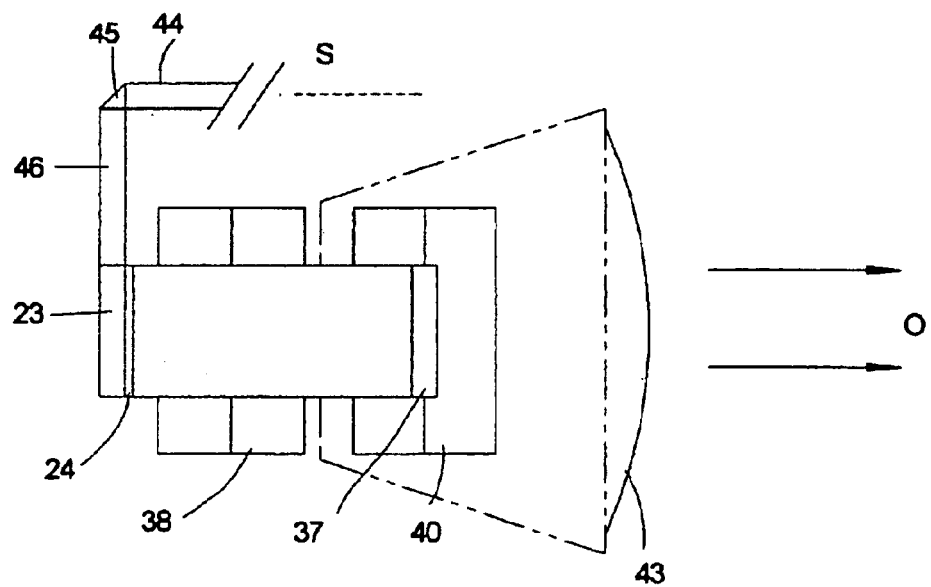
Figure 5:
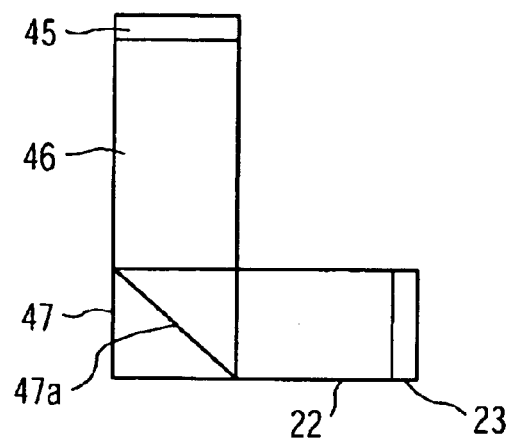
FIG. 5 is a rear view of the portion of the light guide of FIG. 2B between an illumination source and the beam splitter.

FIG. 2B, a side view of the light engine of FIG. 2A, shows another possible arrangement for the input of white light from source S. In this arrangement, white light is guided in from the top by straight light guide sections 44 and 46 and light coupling element 45. FIG. 5, which is a rear view of this arrangement, shows that light guide section 46 is connected to light guide section 22 by light coupling element 47, having an internal reflecting surface 47a.

Figure 2C:
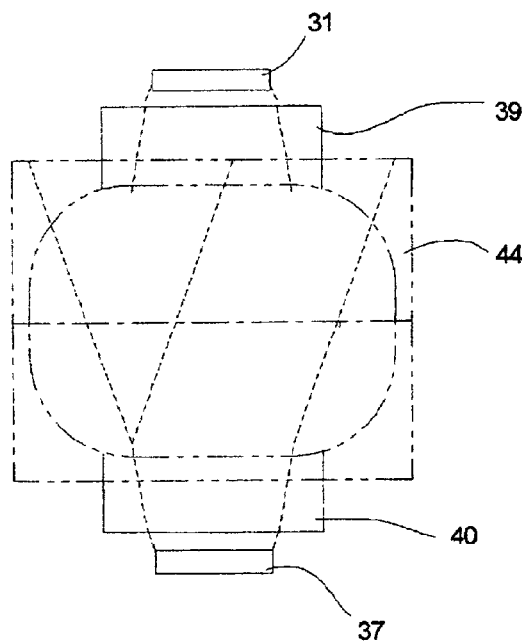
Figure 2D:
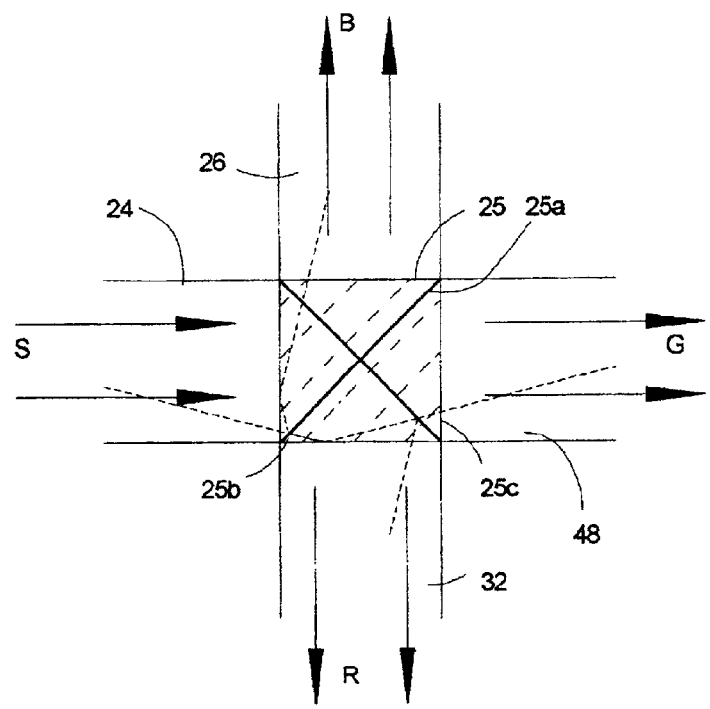
FIG. 2D is a detail view of the beam splitting portion of the light engine of FIG. 2A.

FIG. 2C, a front view of the light engine of FIG. 2A, showing the "lens pupil" 44. The shape of the lens pupil 44 is determined by the rectangular aperture of output lens 43 and the telecentricity (circular cone) of the recombined light. As the beam emerges, it spreads out from the rectangular output aperture and forms a rounded shape FIG. 2D, a detail view of the beam splitter and the adjacent light guide sections, shows that white light entering the beam splitter 25 from straight light guide section 24, is split by the buried dichroic elements into three component beams. Dichroic element 25a reflects blue light, sending component B along light guide section 26, and passes green light, sending component G along light guide section 48. Dichroic element 25b reflects red light, sending component R along light guide section 32, and passes green light, sending component G along light guide section 48. It will be noted that light guide section 48 has been dispensed with in the arrangement of FIG. 2A, due to the proximity of rotating prism 38 to the output face 25c of beam splitter 25.

Figure 3:
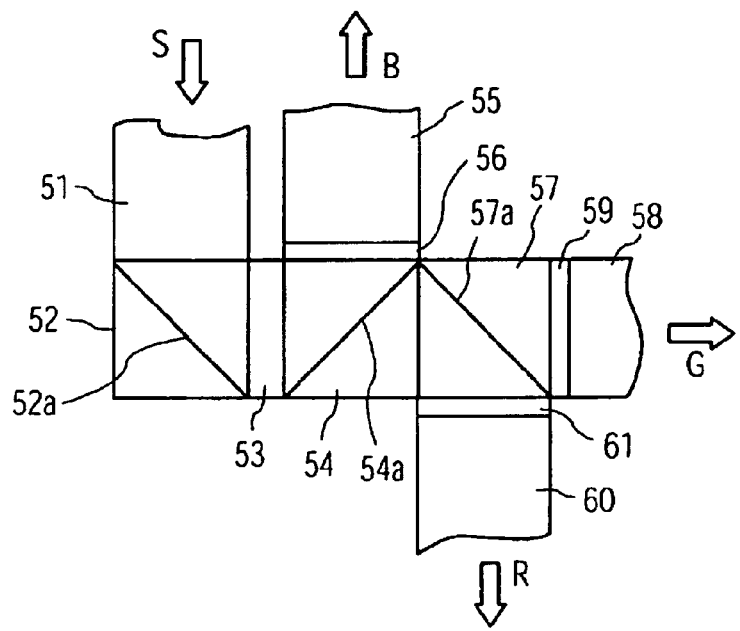
FIG. 3 is a schematic illustration of another embodiment of the beam splitting portion of the light engine of FIG. 2A.

FIG. 3 shows another beam splitting arrangement in which beam splitter 25 with crossed dichroic elements has been replaced by two separate beam splitting elements 54 and 57, each with a buried dichroic surface (54a, 57a). White light from a source S enters beam splitter 54 from a source guide including straight light guide elements 51 and 53, and light coupling element 52 with internal reflecting surface 52a. Blue light is reflected from surface 52a into straight light guide section 55 as component B. Red and green light is passed into beam splitter 57 where red light is reflected by surface 57a into straight light guide section 60 as component R. Green light is passed into straight light guide section 58 as component G. Adhesive layers 56, 59 and 61 secure straight light guide sections 55, 58 and 60 to beam splitters 54 and 57.

Figure 4:
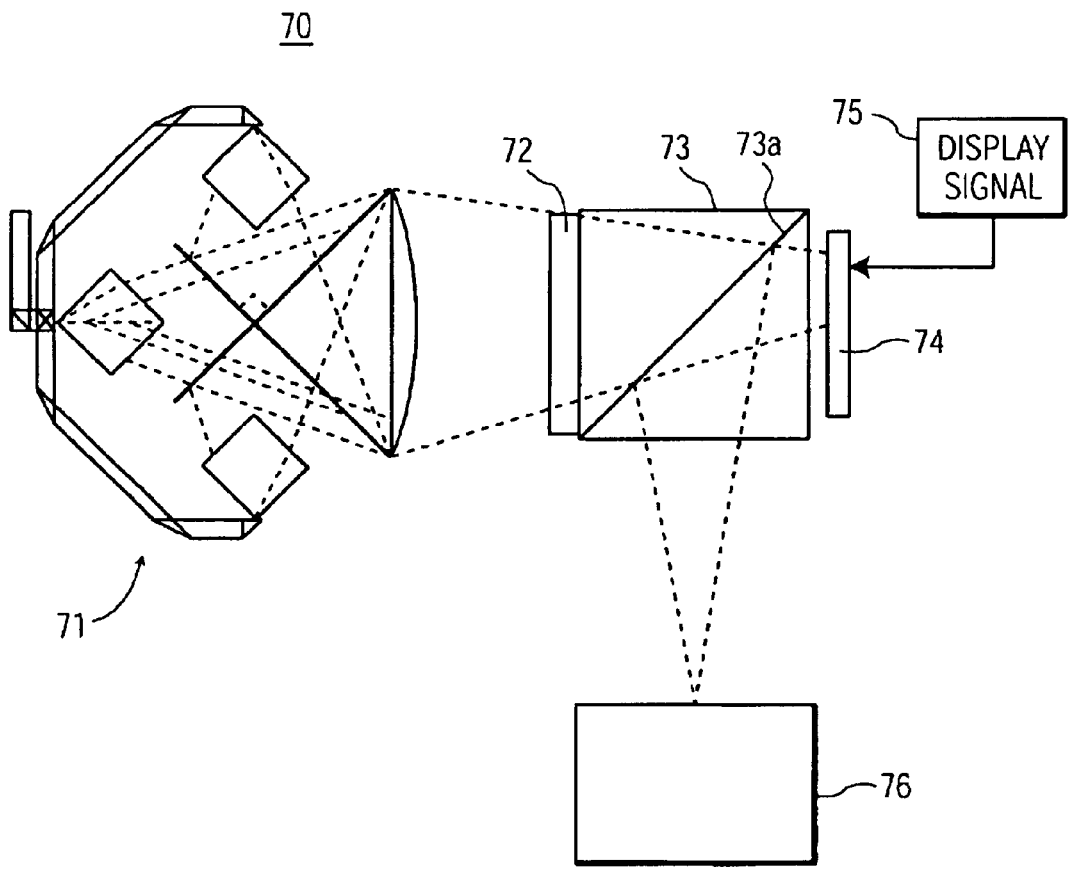
FIG. 4 is a schematic illustration of a projection display system employing the compact light engine of FIG. 2A.

FIG. 4 is a schematic layout for one embodiment of a projection display system 70 employing a light engine 71 of the present invention. Output light from the light engine, which constitutes an image of scrolling bands of R, G, and B light, is directed through polarizer 72 to a polarizing beam splitter (PBS) 73, having an internal polarized beam splitting surface 73a. Polarizer 72 converts the unpolarized light to light of one polarization state, e.g., S. Surface 73a passes this S light to light modulator panel 74, which modulates the light in accordance with a display signal 75, and reflects the modulated light back to the PBS 73. In the process of modulation and reflection, panel 74 changes the polarization state of the light from S to P, and surface 73a reflects the light out of the PBS 73 to a projection lens 76 for display.

Figure 6:
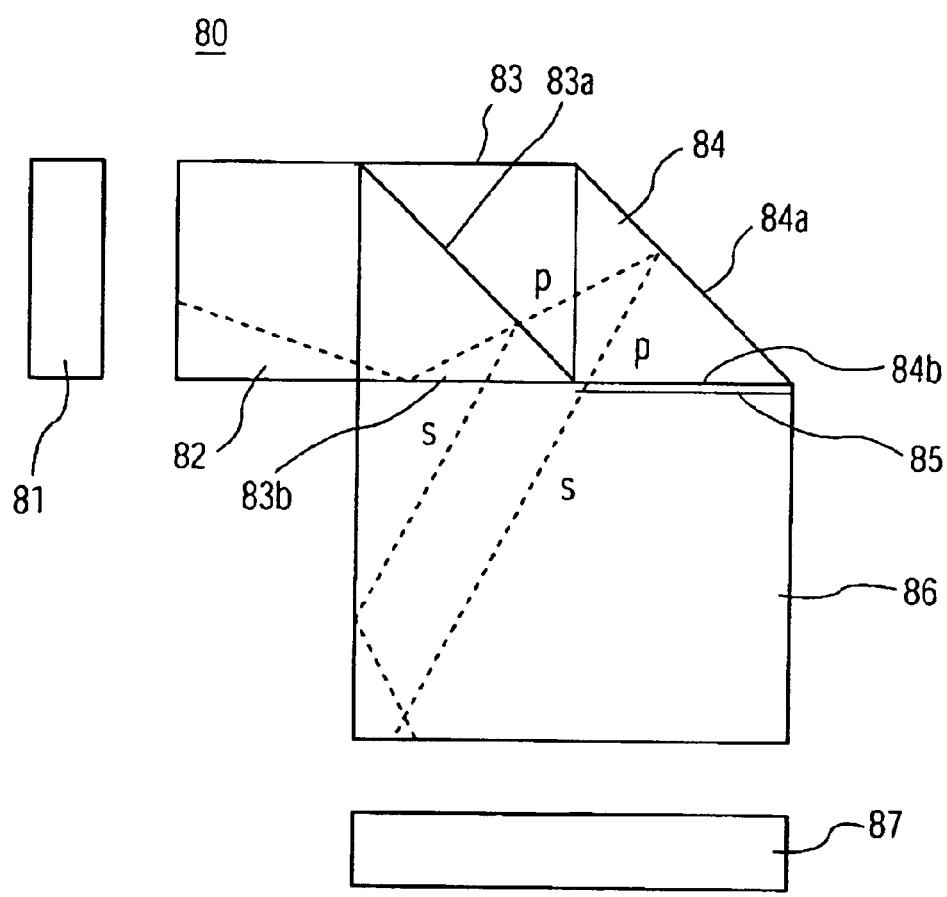
FIG. 6 is a schematic illustration of a polarization conversion system useful in a projection display system of the type illustrated in FIG. 4.

FIG. 6 is a schematic illustration of a polarization conversion system (PCS) 80 which is useful in a scrolling color projection display system of the type shown in FIG. 4. PCS 80 replaces polarizer 72, and is advantageous in that it doubles the width of the scrolling color bands. Light guide section 82 guides color band 81 (seen in cross section, which corresponds to the cross section of light guide section 82). Unpolarized color band 81 enters light coupling element 83 having an internal polarizing layer 83a, where components in the S state of polarization are reflected by layer 83a through output surface 83b into light guide section 86. Components in the P state of polarization are passed through to light coupling element 84, and are reflected from reflecting surface 84a. The reflected P components pass through output surface 84b into light guide section 86 through a half wave plate 85, where they are converted to S components.

PCS 80 has thus converted unpolarized color band 81 into an S polarized color band 87 having double the width of color band 81. This wider aspect ratio is advantageous, for example, in certain higher frequency scanning systems.

The invention has necessarily been described in terms of a limited number of embodiments. From this description, other embodiments and variations of embodiments will become apparent to those skilled in the art, and are intended to be fully encompassed within the scope of the invention and the appended claims.

What is claimed is:

1. A light engine for a projection display system comprising:
    a beam splitter for splitting light from a source into two or more light components;
    a light guide comprising:
        at least a source branch for guiding light from the source to the beam splitter; and
        at least first and second component branches for guiding the light components away from the beam splitter;
            each of the source branch and the first and second component branches consisting of at least one straight light guide section of rectangular cross-section and at least one light coupling element.

2. The light engine of claim 1 in which the beam splitter comprises crossed dichroic elements for splitting the source light into red, green and blue components.

3. The light engine of claim 2 in which first, second and third scanning stripe generators are provided for the red, green and blue light components, respectively, and at least the first and second component branches of the light guide are provided for guiding the green and blue components to scanning stripe generators, respectively.

4. The light engine of claim 3 in which the scanning stripe generators each comprises a rotatable prism.

5. The light engine of claim 2 in which a beam recombiner is provided for recombining the red, green and blue components.

6. The light engine of claim 5 in which the beam recombiner comprises crossed dichroic elements.

7. The light engine of claim 6 in which an output lens is provided for directing the recombined component beams out of the light engine.

8. The light engine of claim 1 in which the beam splitter comprises first and second beam splitting prisms each having a dichroic mirror for splitting light into component beams.

9. The light engine of claim 1 in which the source branch comprises at least two straight light guide sections and at least one light coupling element.

10. The light engine of claim 9 in which the source branch comprises at least four light guide sections and at least three light coupling elements.

11. The light engine of claim 1 in which the first and second component branches each comprise at least three straight light guide sections and at least three light coupling elements, respectively.

12. A projection display system comprising:
    a light engine for a projection display system comprising:
        a beam splitter for splitting light from a source into two or more light components;
        a light guide comprising:
            at least a source branch for guiding light from the source to the beam splitter; and
            at least first and second component branches for guiding the light components away from the beam splitter;
                each of the source branch and the first and second component branches consisting of at least one straight light guide section of rectangular cross-section and at least one light coupling element;
    at least one light modulator panel for modulating light in accordance with a display signal; and
    a projection lens for projecting the modulated light onto a display screen.

13. The projection display system of claim 12 in which a polarizer and polarizing beam splitter (PBS) are provided between the light engine and the light modulating panel, the PBS having a surface for transmitting light of a first polarization state and reflecting light of a second polarization state transverse to the first polarization state.

14. The projection display system of claim 12 in which a polarization conversion system (PCS) is provided between the light engine and the light modulating panel, the PCS having a first light guide section, a first light coupling element adjacent the first light guide section, the first light coupling element having an internal polarizing surface, a second light coupling element adjacent to the first light coupling element, the second light coupling element having a reflecting surface and an output surface, a half wave plate adjacent to the output surface, and a second light guide section adjacent to the output surfaces and of light coupling elements.

\* \* \* \* \*